(12) United States Patent
Faulkiner

(10) Patent No.: US 7,445,268 B2
(45) Date of Patent: Nov. 4, 2008

(54) FOLDING TRUCK BED VEHICLE RAMP

(76) Inventor: John Faulkiner, Rt. 4 Box 573, Bridgeport, WV (US) 26330

( * ) Notice: Subject to any disclaimer, the term of this patent is extended or adjusted under 35 U.S.C. 154(b) by 85 days.

(21) Appl. No.: 11/713,816

(22) Filed: Mar. 5, 2007

(65) Prior Publication Data
US 2007/0205632 A1 Sep. 6, 2007

Related U.S. Application Data

(60) Provisional application No. 60/779,203, filed on Mar. 6, 2006.

(51) Int. Cl.
*B62D 33/02* (2006.01)
(52) U.S. Cl. .................................. 296/183.1
(58) Field of Classification Search .............. 296/183.1, 296/31, 63, 26.08, 26.09, 26.1, 26.11, 50, 296/57.1, 61; 14/69.5
See application file for complete search history.

(56) References Cited

U.S. PATENT DOCUMENTS

| 449,228 | A | * | 3/1891 | Myers et al. ............... 119/849 |
|---|---|---|---|---|
| 1,639,879 | A | * | 8/1927 | Buffington .................... 296/61 |
| 3,517,791 | A | * | 6/1970 | Miles .......................... 193/41 |
| 3,870,170 | A | * | 3/1975 | Noble et al. ................. 414/537 |
| 4,990,049 | A | * | 2/1991 | Hargrove ..................... 414/537 |
| 5,538,308 | A | * | 7/1996 | Floe ............................. 296/61 |
| 5,634,228 | A | * | 6/1997 | Johnston ..................... 14/69.5 |
| 5,795,125 | A | * | 8/1998 | Walkden ...................... 414/537 |
| 5,813,071 | A | * | 9/1998 | Breslin et al. ................ 14/71.1 |
| 5,853,281 | A | * | 12/1998 | Farmer ........................ 414/537 |
| 6,042,923 | A | * | 3/2000 | Lewis ........................... 428/68 |
| 6,484,344 | B1 | * | 11/2002 | Cooper ........................ 14/71.1 |
| 6,575,516 | B2 | * | 6/2003 | Webber ........................ 296/61 |
| 6,837,669 | B2 | * | 1/2005 | Reed et al. ................... 414/537 |
| 6,880,194 | B2 | * | 4/2005 | O'Donnell et al. ........... 14/69.5 |
| 7,128,357 | B1 | * | 10/2006 | Carroll .......................... 296/61 |
| 2003/0071476 | A1 | * | 4/2003 | Schilling ....................... 296/61 |
| 2004/0226116 | A1 | * | 11/2004 | O'Donnell et al. ........... 14/69.5 |
| 2006/0225229 | A1 | * | 10/2006 | Zhang .......................... 14/69.5 |
| 2006/0288501 | A1 | * | 12/2006 | Thygesen .................... 14/69.5 |

* cited by examiner

*Primary Examiner*—H Gutman

(57) ABSTRACT

This invention is a loading ramp system which allows for the transport of small vehicles into and out of pick-up truck beds. This system included twin ladder ramps which can be opened out or folded up and in either position angled from the truck bed or deck lid to the ground. When folded, these ramps can be telescoped into a flat, unobtrusive storage container, which in turn is fixed to the bottom of the truck bed. Two angle irons attached to the truck fit the outer part of the ramps when unfolded and in combination with the attachments of the ramp to the storage rack prevent the ramps from dislodging from the truck bed or deck lid when in use.

3 Claims, 9 Drawing Sheets

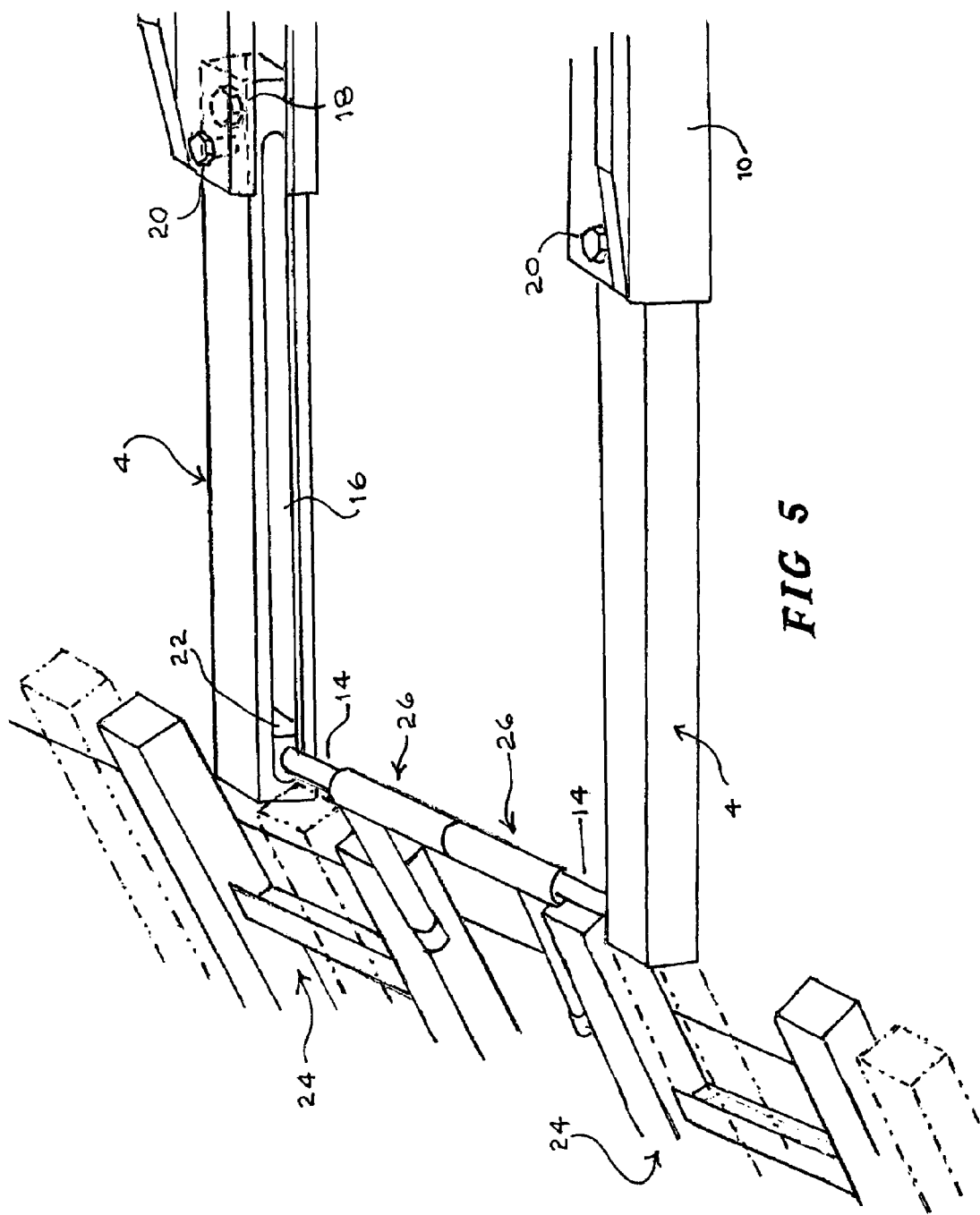

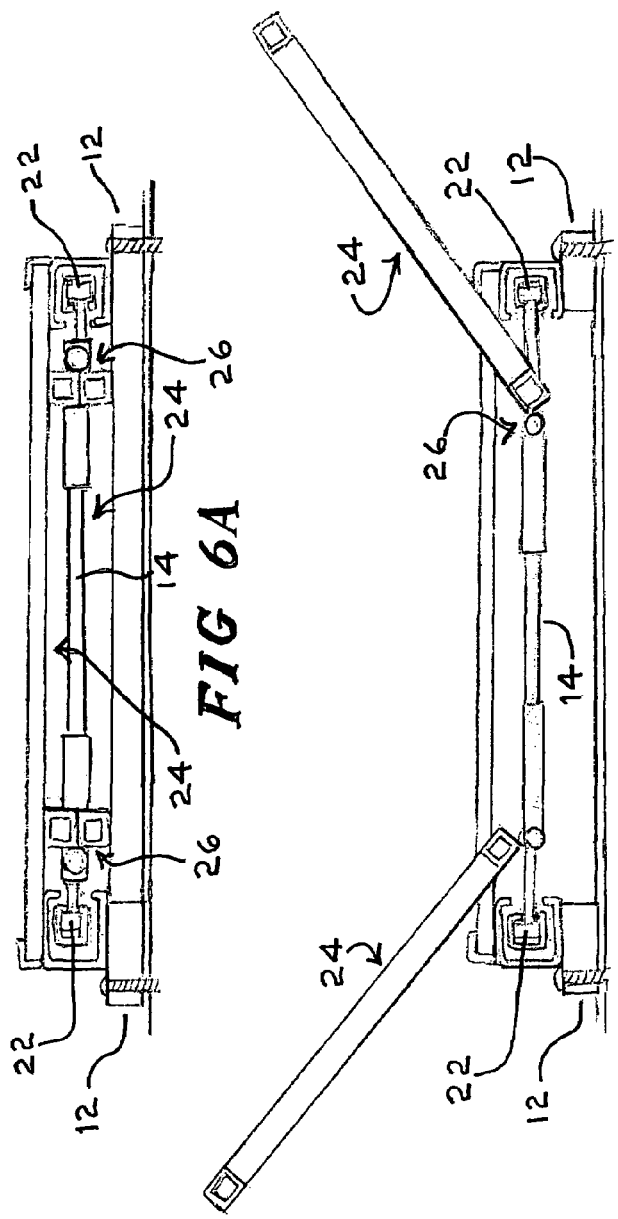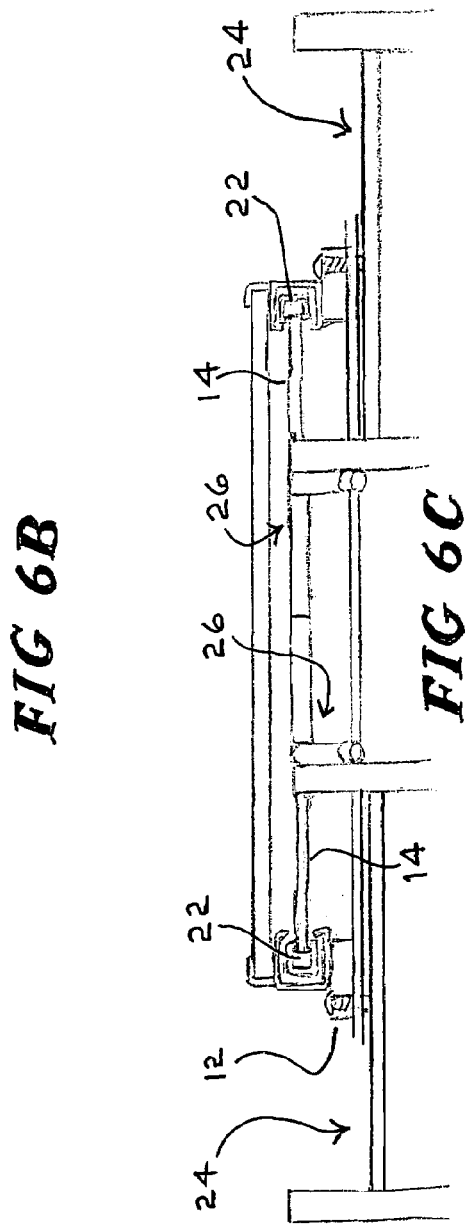

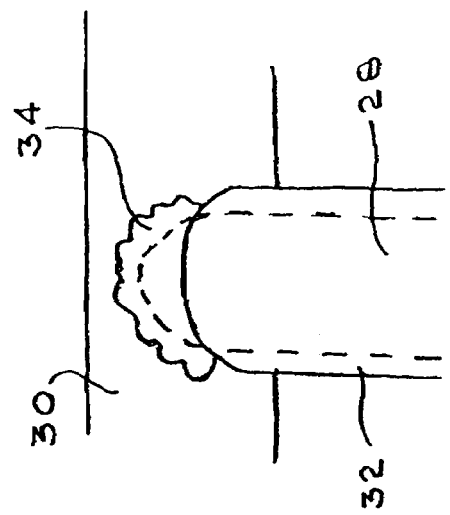
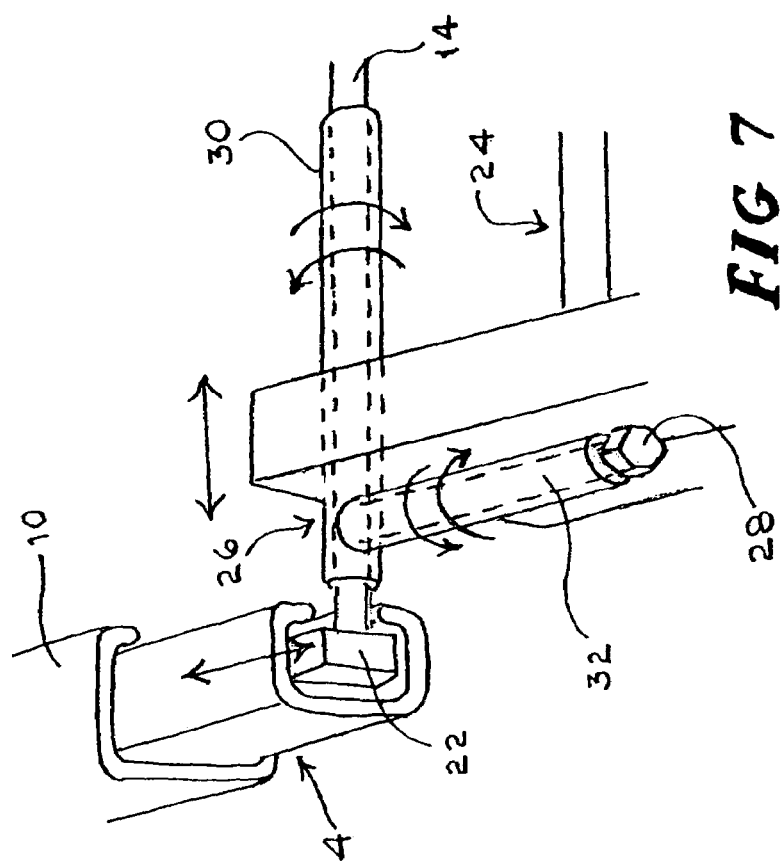

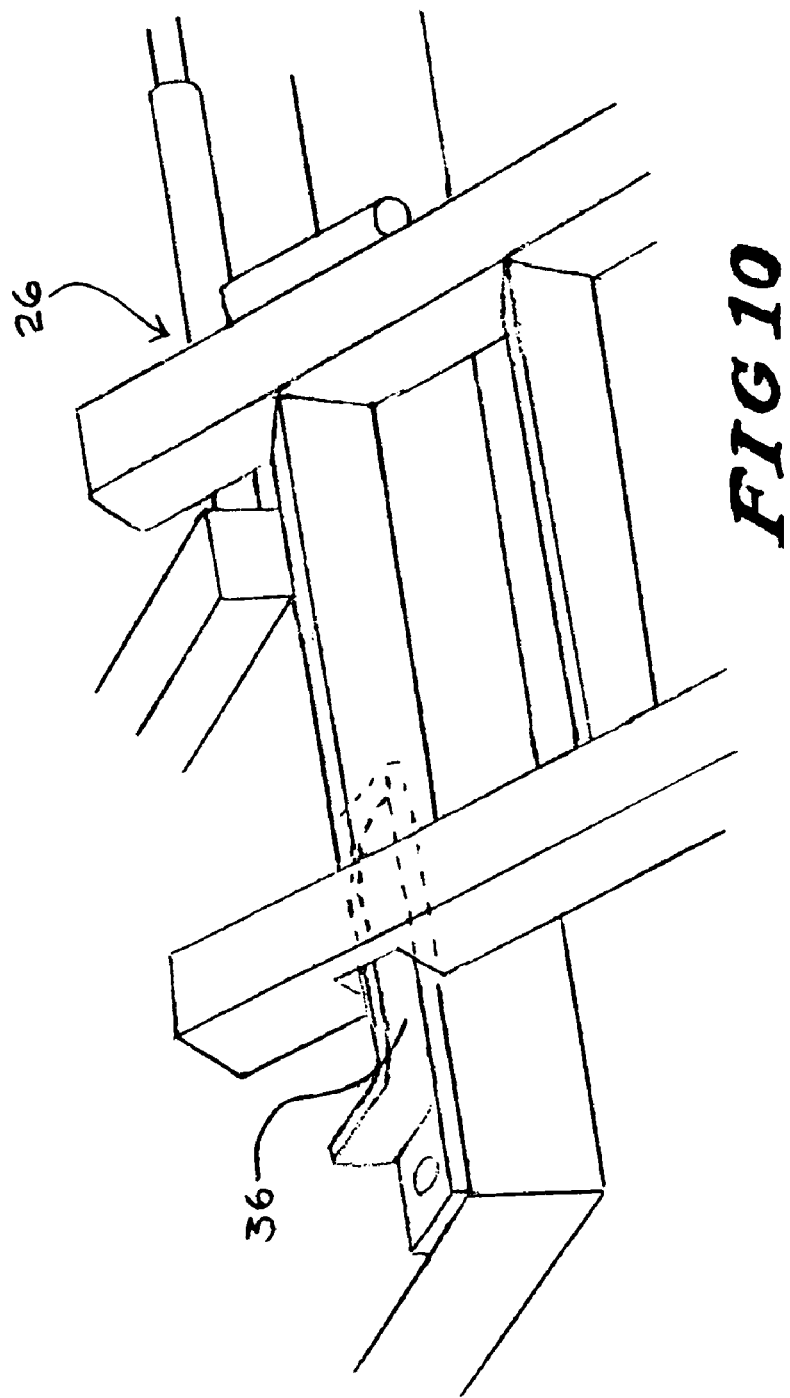

FOLDING TRUCK BED VEHICLE RAMP

CROSS-REFERENCE TO RELATED APPLICATIONS

This application claims the benefit under 35USC1199 of the priority of U.S. provisional Ser. No. 60/779,203 entitled "Folding Truck Bed Vehicle Ramp", filed Mar. 6, 2006 in the name of John Faulkiner.

FEDERALLY SPONSORED RESEARCH

Not Applicable

SEQUENCE LISTING OR PROGRAM

Not Applicable

BACKGROUND OF THE INVENTION

1. Field of Invention

This invention relates to pick-up truck ramps, specifically a means to facilitate the transport of small vehicles into and out of pick-up truck beds.

2. Description of Prior Art

The use of tailgate ramps is known in the prior art. Some ramps fold up and can be carried away, like U.S. Pat. No. 6,868,574. These ramps, while being convenient, are notoriously unsafe, as they have poor anchoring and often come loosing during ascension, potentiating serious injury. Though the above patent and related patents detail mounting systems, these systems are inconvenient to use and install. Some ramps fold up into the tailgate, like U.S. Pat. Nos. 6,913,305 and 6,575,516. These ramps, while solving the previous safety concern, are of an intricate and delicate construction, a problem when used in repetition to support weighty vehicles. These types of ramps are also expensive to manufacture for the same reasons. Additionally, their placement on the top/inside of the tailgate decreases usable space inside the truck bed. These ramps also must be custom made for each model truck's tailgate. Some ramps slide into the truck bed unchanged like U.S. Pat. Nos. 6,390,761 and 6,042,923. The former is a very complicated construction, and certainly not practical for common usage.

The ramp disclosed in U.S. Pat. No. 6,042,923 has several significant disadvantages. First its size makes it inconvenient. It's too large to take in and out of a truck often, meaning it must be permanently installed in the bed. It would therefore waste space in the bed when not in use. Second, its rollers could and will likely become jammed with mud, and because of its closed housing, it would be difficult to clean. Third, it can not safely fit trucks with six-foot bed because it does not telescope. A ramp installed permanently in a truck's bed must traverse the lowered tailgate before it can angle and form an ascendable ramp. Because this ramp does not telescope, a portion of its total enclosed length must be sacrificed for that traversing purpose. In other words, if its housing is six feet, and it can't be more than that for a six foot bed, the total of the ramp can only be six feet. After a portion of its six foot entirety traverses a truck's eighteen inch tailgate, the remaining length of ramp for angling will only be four feet six inches. Such a short length for the angled portion makes for a steep and therefore dangerous ramp. While a ramp of this construction will safely fit eight foot and longer truck beds, it must be an eight foot unit with equivalent housing, again because it cannot telescope. Fourth, because of the sheer bulk of this ramps design, an eight foot version and even a six foot version would be a substantial construction effort and create logistical problems for shipping. In addition its overall cost would therefore be prohibitive.

3. Objects and Advantages

It is therefore an important object of the present invention to provide a folding adjustable size ramp assembly allowing for easy loading and unloading of small vehicles from varying sized pickup trucks bed.

Another object of the present invention provides a three-stage telescoping ramp assembly whose angleable section is an equivalent length to that of its housing, and that which functions via a sliding section to create its telescoping character.

Another object of the present invention provides a twin ramp assembly which folds open during use and folds back into itself for convenient space saving storage.

Another object of the present invention provides for a ramp that will fit almost any dimensioned truck bed.

Another object of the present invention provides for a ramp assembly which creates a safer angle of ascent.

A further object of the present invention provides for a ramp assembly which is lightweight, wieldy, easily cleaned, and readily shipped by conventional ground carriers It is another object of the present invention to provide a ramp assembly which may be efficiently manufactured and marketed.

Still another object of the present invention provides for a ramp assembly which can become a permanent yet unobtrusive attachment to a truck, but also can be removed quickly by a single person if necessary.

It is a further object of the present invention to provide a ramp which is of a durable and reliable construction.

Yet another object of the present invention is to provide a ramp assembly which includes a housing with open rear wall to receive a ladder ramp and ladder rack top to facilitate easy cleaning and an overall lightweight construction, dimensioned for positioning within the bed of a pickup truck.

Other objects and advantages of the present invention will become apparent from a consideration of the drawings and ensuing description.

SUMMARY

The ramp assembly construction of the present invention solves these problems encountered by the prior art by creating a ramp which first folds onto itself then telescopes into its housing, the housing being secured to the truck bed, allowing the assembly to fit unobtrusively into varying sized truck beds while still providing a constant safe angle of ascension for the transported small vehicle.

BRIEF DESRIPTION OF THE DRAWINGS

FIG. 5 is a zoomed three-quarter perspective view of a ramp assembly detailing a telescoping slide mechanism in fully deployed position.

FIG. 6a is a rear tailgate level view of a ramp assembly detailing a folding mechanism in stowed position.

FIG. 6b is a rear tailgate level view of a ramp assembly detailing a folding mechanism in partially deployed position.

FIG. 6c is a rear tailgate level view of a ramp assembly detailing a folding mechanism in fully deployed position.

FIG. 7 is a zoomed top perspective view of the sliding-hinging-angling mechanism FIG. 8 is a super zoomed top perspective view of the sliding-hinging-angling mechanism's construction

FIG. 10 is a view of the ladder ramp in engagement with arresting angle irons.

DETAILED DESCRIPTION OF THE PREFERED EMODIMENT

Figure 1:
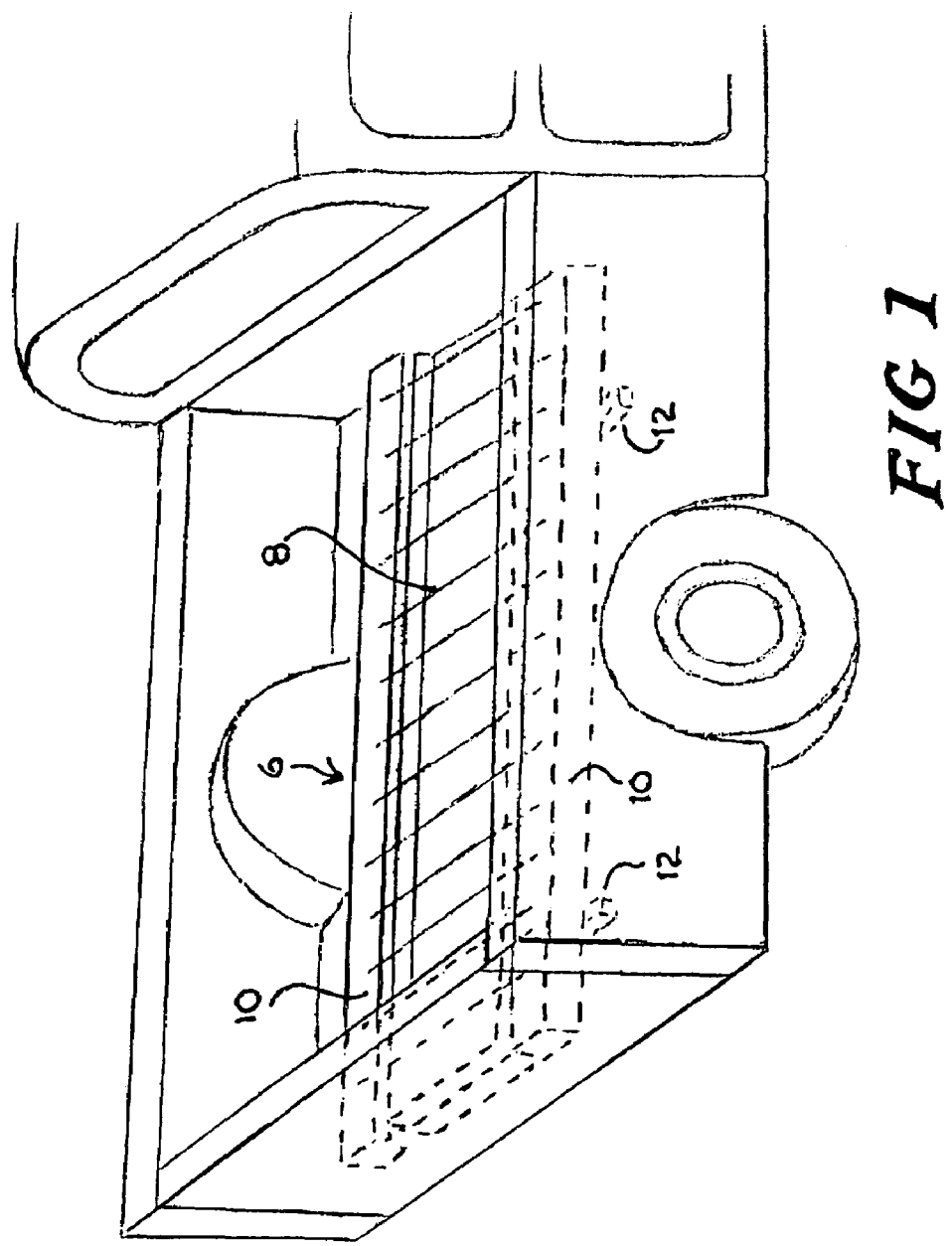
FIG. 1 is a three quarter perspective view of a truck equipped with a ramp assembly of present invention in stowed position.
Figure 2:
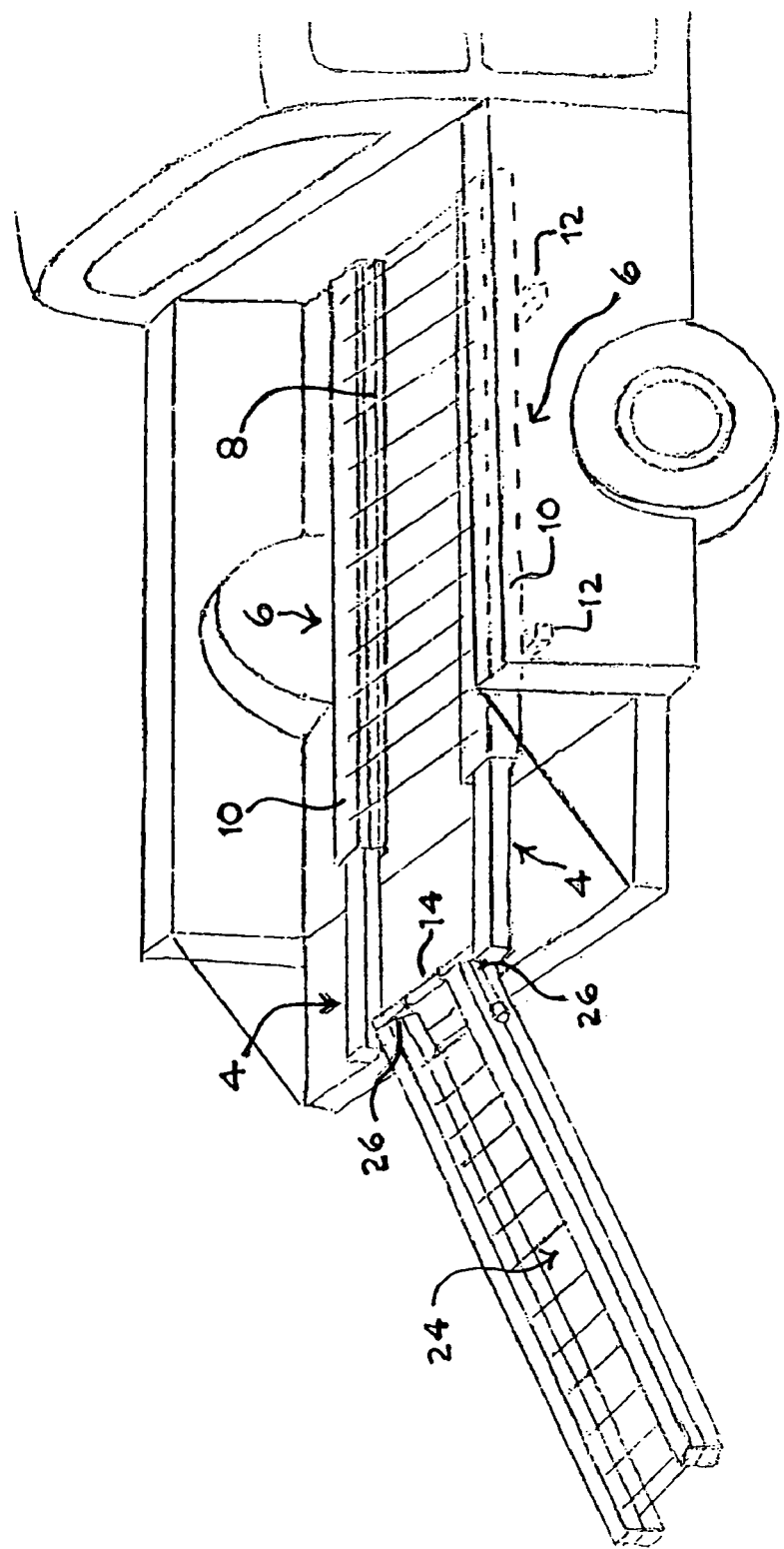
FIG. 2 is a three quarter perspective view of a truck equipped with a ramp assembly with the ramp in partially deployed/motorcycle position.
Figure 3:
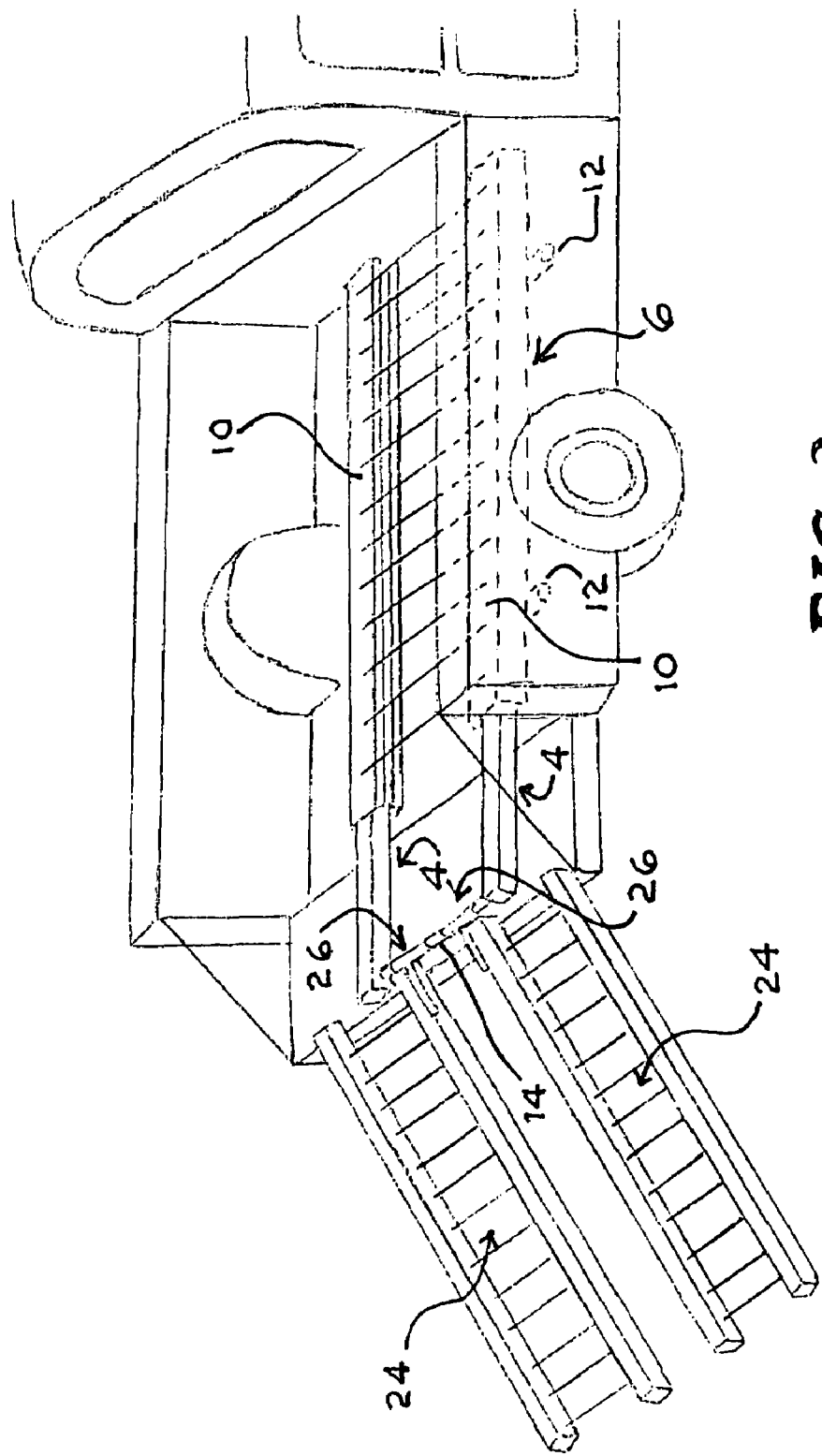
FIG. 3 is a three quarter perspective view of a truck equipped with a ramp assembly with the ramp in fully deployed/ATV/tractor position
Figure 4:
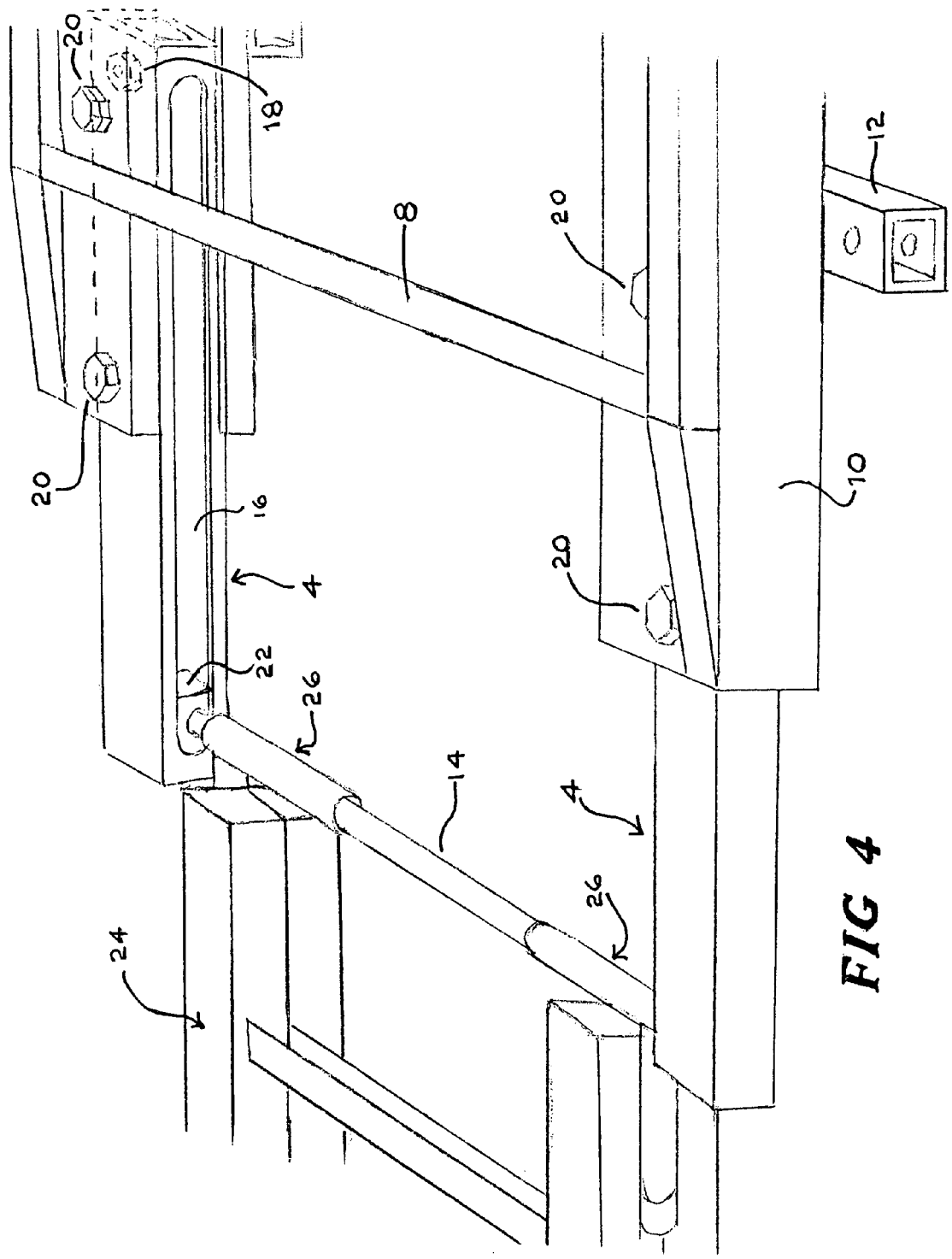
FIG. 4 is a zoomed three-quarter perspective view of a ramp assembly detailing a telescoping slide mechanism in partially deployed position.
Figure 9:
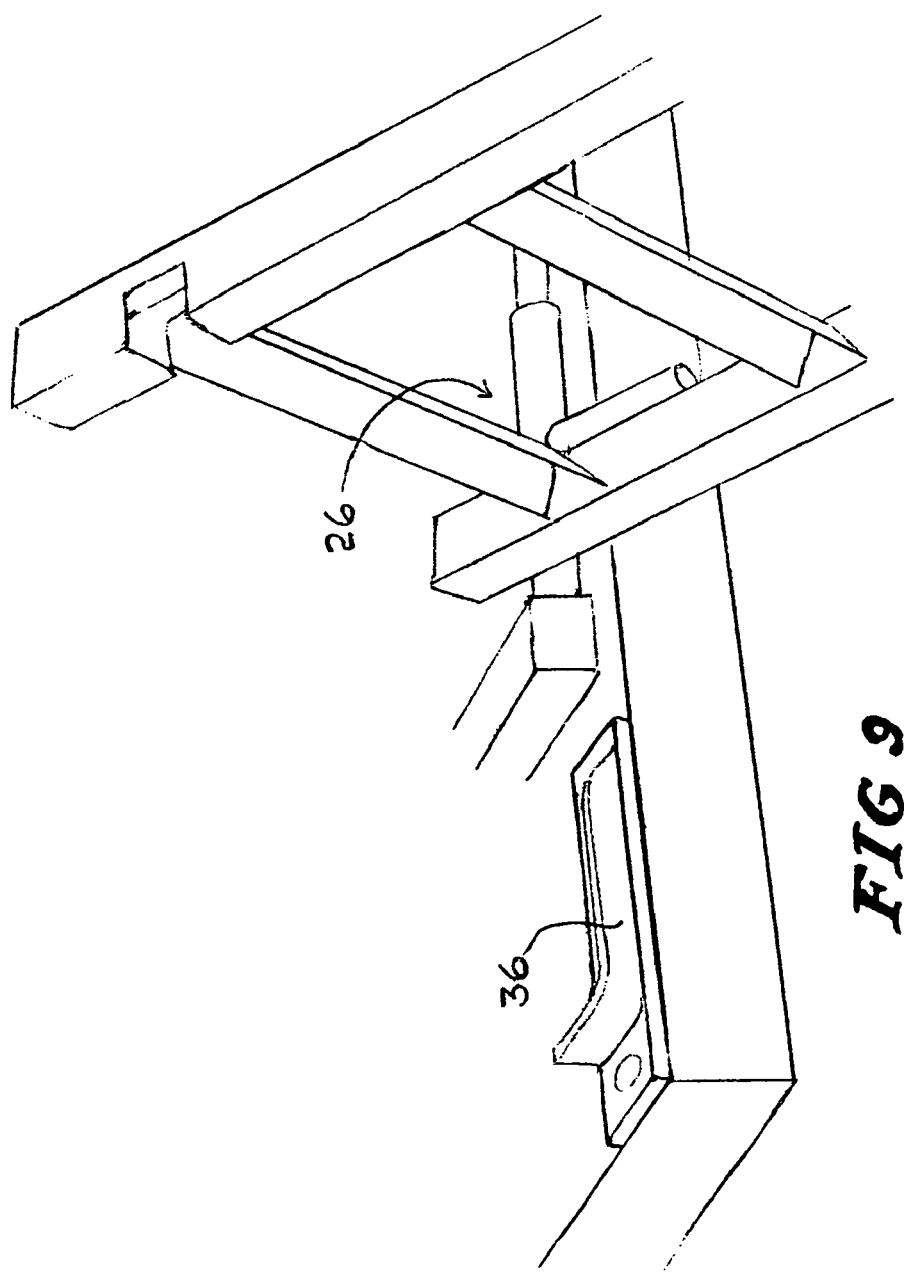
FIG. 9 is a view of the ladder ramp prior to engagement with arresting angle irons.

FIGS. 1, 2 and 3 give an overview of the present invention. Twin ladder ramps 24 are connected via sliding-hinging-angling mechanisms 26 to slide bar 14, which is connected to telescoping slides 4 and in turn to ramp housing 6. Ramp housing 6 is framed by master sleeves 10 and topped by ladder rack 8. Ramp housing 6 is securely mounted to a truck bed with screws or bolts through along mounting tabs 12. The function of telescoping slides 4 is detailed in FIGS. 4 and 5. At the left of FIGS. 4 and 5 are ladder ramps 24. Ladder ramps 24 are attached via sliding-hinging-angling mechanisms 26 to slide bar 14. Slide bar 14 fits through sliding notches 16 of telescoping slides 4. Sliding notches 16 allow ladder ramps 24, via slide bar 14 and using square slide nuts 22, to freely slide horizontally inside the length of telescoping slides 4. Telescoping slides 4 are in turn allowed to freely slide inside of master sleeves 10. However telescoping slides 4, and thus ladder ramps 24, cannot be removed rearward from ramp housing 6, as slide stop nuts 18, welded to telescoping slides 4, impact with an engaged slide stop bolts 20.

The function and purpose of sliding-hinging-angling mechanisms 26 is detailed in FIGS. 4, 5, 6 and 7. Sliding-hinging-angling mechanisms 26 allows for ladder ramps 24 to fold onto each other for compact storage, slide horizontally to adjust to the varying widths of both truck beds and small vehicle wheel bases, and angle vertically to function as a ramp to the ground. Ladder ramps 24 are able to fold, slide, and angle by the following unique mechanism detailed in FIG. 7. Sliding-hinging-angling mechanisms 26 consist of hinge bolts 28 which fit through hinge sleeves 32 and are welded to slide bar sleeves 30. Hinge sleeves 32 are free from the movement restriction imposed by welds 34 because hinge sleeves 32 freely rotate on hinge bolts 28. Further, because hinge sleeves 32 are welded to ladder ramps 24, ladder ramps 24 can also freely rotate on hinge bolts 28. Ladder ramps 24, attached via hinge sleeves 32 to slide bar sleeves 30, can slide horizontally along and rotate vertically around slide bar 14 because slide bar 14 fits through slide bar sleeves 30 and thereby allows slide bar sleeves 30 freedom of both sliding and rotational movement.

FIGS. 6 show the position of sliding-hinging-angling mechanisms 26 relative to ladder ramps 24. Hinge sleeves 32 are welded to ladder ramps 24 in a location that when folded, ladder ramps 24 present themselves to each other on a level plane. Hinge sleeves 32 are welded along the line where the frames of ladder ramps 24 meet when folded, but only welded to one ladder ramp 24 per side.

The use of the present invention is accomplished as follows viewing FIGS. 1, 2, 3, 4 and 5: A user, wanting to load a small vehicle in the truck where present invention is mounted, grasps ladder ramps 24 and pulls them rearward from ramp housing 6. As the user pulls on ladder ramps 24, slide bar 14 reaches its maximum within telescoping slides 4, at which point telescoping slides 4 will slide within master sleeves 10. Eventually telescoping slides 4 will reach the end of the trucks tailgate at which point slide stop bolts 20 will impact slide stop nuts 18. Ladder ramps 24, now free of the truck bed and tailgate, will be able to angle downward via sliding-hinging-angling mechanisms 26 and touch the ground, creating a ramp of ascension into the truck's bed. The ends of ladder ramps 24 fit snugly within arresting angle irons 36 and are thus prevented from turning horizontally. The user then may drive their motorcycle up ladder ramps 24 and onto the ladder rack 8. However if the user wishes to load an ATV or other four wheeled vehicle he can unfold ladder ramps 24 and adjust them to fit the width of the truck bed and/or the loaded vehicle's wheel base, all accomplished via sliding-hinging-angling mechanisms 26. Once loaded, the user may stow ladder ramps 24 by reversing the steps above. The position of ladder rack 8 atop master sleeves 10 allow ladder ramps 24 to be stowed without obstruction from the now loaded vehicle. The ladder in stowed position is seen in FIG. 1.

REFERENCE NUMERALS 4 telescoping slide
6 ramp housing
8 ladder rack
10 master sleeve
12 mounting tab
14 slide bar
16 sliding notch
18 slide stop nut
20 slide stop bolt
22 square slide nut
24 ladder ramp
26 sliding-hinging-angling mechanism
28 hinge bolt
30 slide bar sleeve
32 hinge sleeve
34 weld
36 arresting angle iron

What is claimed is:

1. A loading ramp system for facilitating the transport of small vehicles into and out of pick-up truck beds comprising:
   a. twin ladder ramps connected by a sliding, hinging, angling, mechanism to slide bars which allow the ramps when in a folded, storage configuration to telescope and be stored in a ramp housing which is fixed on a top surface of the truck bed or to be pulled out from the ramp housing and extended down from the truck bed to the ground in either an extended or an open configuration,
   b. two angle iron restraints fixed to a tailgate of a truck which in combination with the ramps connected to the sliding, hinging, angling mechanism prevents the ramps when in the open configuration from dislodging from the tailgate and truck bed.

2. A loading ramp system described in claim 1 wherein the ramps when in the folded, storage position within the ramp housing will have a width which fits within the confines of the wheels of a standard all terrain vehicle.

3. A loading ramp system described in claim 1 wherein the sliding, hinging, angling mechanism is folded and stored conveniently within the ramp housing, the ramps are pulled out and angled down from the truck bed to the ground in either the extended configuration or the open configuration, the ramps pivot to the open configuration and slide in and out laterally to adapt to the appropriate width of the wheelbase of the vehicle being transported into or out of the truck bed.

* * * * *